Sept. 8, 1970    L. VON REPPERT ET AL    3,527,698
METHOD AND APPARATUS FOR REMOVING WATER FROM SEWAGE SLUDGE
Filed July 30, 1968    2 Sheets-Sheet 1
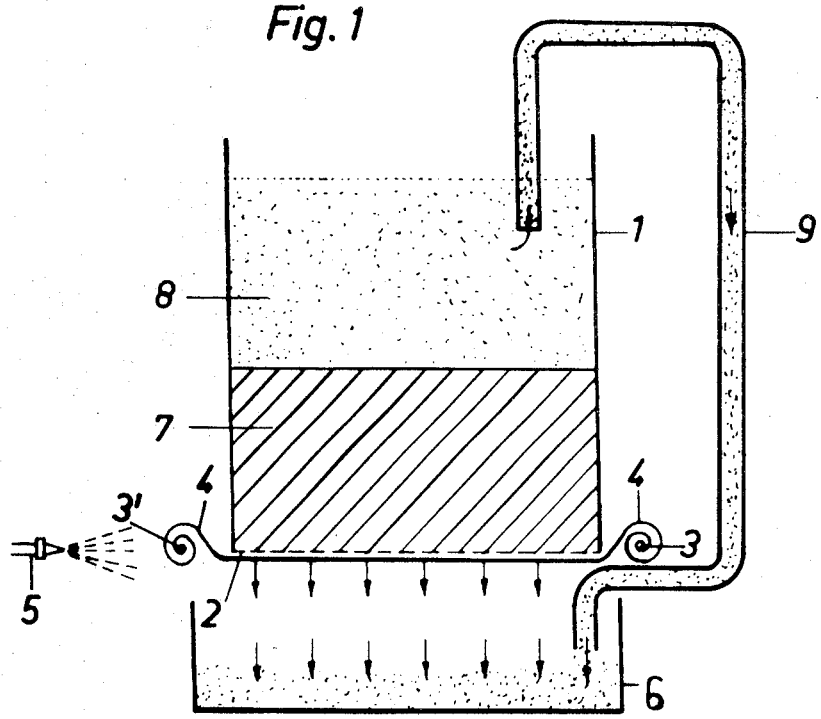
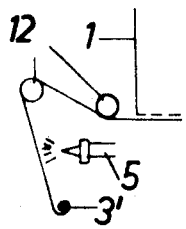
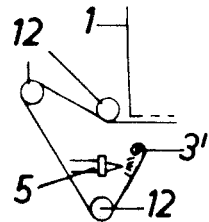
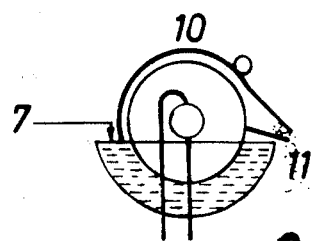
INVENTOR.
Lothar Von Reppert,
Wolfgang Jeske, & Eduard Hilscher
By Littlepage, Quaintance & Wray United States Patent Office 3,527,698
Patented Sept. 8, 1970

3,527,698
METHOD AND APPARATUS FOR REMOVING WATER FROM SEWAGE SLUDGE
Lothar von Reppert, Wiesbaden, Wolfgang Teske, Kronberg, Taunus, and Eduard Hilscher, Frankfurt am Main, Germany, assignors to Chemische Werke Albert, Wiesbaden-Biebrich, Germany, a corporation of Germany
Filed July 30, 1968, Ser. No. 748,744
Claims priority, application Germany, Aug. 22, 1967,
C 43,146
Int. Cl. B01d 33/00; C02c 3/00
U.S. Cl. 210—10                                    10 Claims

ABSTRACT OF THE DISCLOSURE

A method of removing water from sewage sludge in which the sludge is introduced into at least one container having a porous bottom permitting water to pass therethrough, collecting the water that runs from the container, allowing the sludge to settle in the container until it separates into two layers, the upper layer being a supernatant layer of water, and leading off the layer of water, and an apparatus for removing water from sewage sludge.

---

Figure 5:
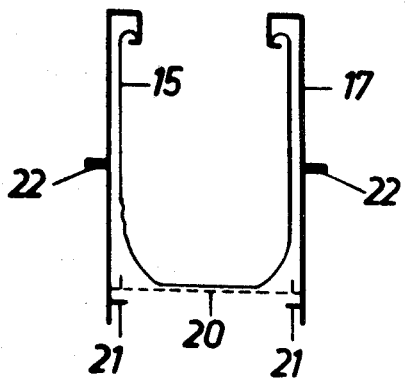

This invention is concerned with an improved method for the removal of water from sewage sludge and with apparatus for use in this method.

The completely putrefied sewage sludge obtained in sewage treatment plants with a water content of 90 to 97%, can neither be filtered off nor pressed out satisfactorily without addition of flocculating agents, and is generally drained into so-called settling tanks. A paste-like mass is formed therein from the sludge in the course of time; the removal of water therefrom in a natural way is almost impossible and can only be brought about by the action of heat or by artificial drying.

The water adhering to the sludge must not pass into the water in the ground, and the settling tanks are therefore suitably coated and sealed. Water thus cannot escape therefrom but only evaporates partially, e.g., by exposure to sunshine. The evaporated quantity, however, is small and is often exceeded by normal rainfall and is thus more than compensated.

According to the present invention there is provided a method of removing water from sewage sludge in which the sludge is introduced into at least one container having a porous bottom out of which water may run, collecting the water that runs from the container, allowing the sludge to settle in the container until it separates into two layers, the upper layer being a supernatant layer of water, and leading off the layer of water.

Further according to the present invention there is provided an apparatus for removing water from sewage sludge including a container having a porous bottom, and either having a fabric of synthetic fibre disposed underneath the container whereby water flowing out of the container passes through the fabric, means for tensioning the fabric and for displacing it laterally underneath the container, and a spray device for cleaning the fabric, or in which the container has the form of a sack or a tube or a part of the container has the form of a sack and another part has that of a tube of synthetic fabric which is suspended in a tiltable support frame or in a housing which is open at the bottom and which may be provided with a movably mounted perforated bottom member, said apparatus further including a reservoir for collecting water flowing from the container, and means for discharging liquid at the top of the container.

In order that the invention may be well understood preferred embodiments and their methods of use will now be described with reference to the accompanying drawings in which:

FIG. 1 is a diagrammatic side view of a first embodiment of apparatus according to the invention for removing water from sewage sludge, FIG. 2 is a modification of part of FIG. 1, FIG. 3 is another modification of part of FIG. 1, FIG. 4 is a diagrammatic view of a suction cell filter for use with the apparatus of FIG. 1, FIGS. 5, 6 and 7 are diagrammatic side views of a second, third and fourth embodiment respectively, of apparatus according to the invention.

The apparatus shown in FIG. 1 consists of:

(a) At least one solid or sack-lined plastic container 1 having a perforated bottom 2, (b) A laterally displaceable fabric 4 covering the bottom of the container 1 made from a permeable fabric, preferably of synthetic fibres, such as polyamides, polyacrylonitriles, polyethylene terephthalate or the like, which is maintained under tension by a tensioning device, preferably rollers, which makes a rolling off and rolling up possible, 3 and 3', (c) A spray device 5 for cleaning the fabric 4, (d) A reservoir 6 for collecting the water emerging from the perforated bottom 2 of the container 1, (e) A suitable device for the removal of the aqueous phase remaining in the container 1.

This apparatus works as follows:

(a) Sewage sludge is filled into the container 1 made from, for example, polyethylene, polypropylene, or, polycaprolactam. Under the pressure of the weight of the sludge, a part of the water contained therein runs off through the perforated bottom 2, whereby it (b) Also passes the fine-meshed fabric 4 which covers the bottom of the container 1. This sieve fabric can be rolled from one roller 3 onto another 3', which is effected continuously or discontinuously in such a manner that the portion located underneath the bottom of the container 1 is practically always free of sludge particles to such an extent that the meshes of the fabric 4 do not become clogged.

The meshes of the fabric 4 are preferably finer than the perforations of the container 1.

(c) Before running onto the roller 3' but also on the roll itself, the fabric 4 can be rinsed through and/or sprayed with water by means of the spray device 5 and thus freed of the sludge particles. When the fabric has almost completely run onto the roller 3' and the roller 3 is correspondingly empty, the fabric is allowed to run from roller 3' onto roller 3, thus in the reverse direction, it being then advisable to mount also at the roller 3 a spray device similar to the device 5. It is, however, also possible to allow the fabric which has run onto the roller 3' and which is indeed kept clean by the spray device 5, to run completely back again onto the roller 3 and again to feed it back gradually, as described, onto the roller 3'.

The spray device can be arranged in many ways, e.g. in the way indicated in FIGS. 1 to 3. The arrangement according to FIGS. 2 to 3, wherein the numeral 12 designates rollers, has the advantage that sludge particles located on the fabric are pressed out of the meshes from the underside of the fabric so that effective cleaning is achieved. The arrangement according to FIG. 3 has the advantage that the solid particles running off on the fabric together with the spray liquid come into contact with the already sprayed portions of the fabric. An additional spraying between the two outer rollers 12 can then be effected.

(d) The water running off through the perforated bottom 2 of the container 1 and through the fabric 4 arrives in the reservoir 6. This can be constructed as a trough or as a channel, dependent upon whether the water should first be collected or immediately carried away, e.g. fed to a main ditch. The water collected in the reservoir 6 is suitable, for example as water for plants.

(e) The residual sludge remaining in the container 1 separates after some time into two layers: at the bottom a so-called sump 7 is formed which is preferably left in the container 1 until an approximately solid consistency is reached. Above the sump 7 is located a relatively clear aqueous phase 8 which is led off by means of a suitable device, e.g. the syphon or suction device 9, e.g., conveyed into the reservoir 6. As mentioned under (d), the water here combined can be collected in the reservoir 6 itself or in another suitable storage vessel, for example a tank, or fed to a main ditch.

It is also possible to feed the sump 7, without it settling to a suction cell filter or other suitable filter 10 until it is so solid that it can be dug out. The residues thus obtained can either serve directly as a soil improving agent or be composted with refuse which is preferably homogenised or, if desired, can be burned together therewith. Likewise, it is also possible to mix the residues with inorganic plant nutrients and/or precursors thereof, e.g., crude phosphates, and wholly or partially to decompose this mixture with sulphuric, phosphoric or nitric acid, whereby valuable fertilisers with variable contents of organic material are obtained. Due to the reaction heat of the decomposition, the moisture evaporates so that dry products are obtained which can be granulated.

For reasons of simplicity, only a single plastic container 1 has been shown in the drawing. It is, however, obvious, that dependent on the quantity of sewage sludge to be treated, a greater or smaller number of plastic containers can be used. Their number is preferably so chosen that a continuous operation of the whole plant becomes possible; in determining the number required, the time which may be necessary for the settling of the sludge should be taken into consideration.

Instead of rigid walled containers, also tube-like containers may be used which have a so-called cross bottom, i.e., a bottom arranged in the form of a cross.

In one embodiment (not illustrated) the plastic containers are provided with support or suspension devices. In containers having rigid walls, these can be, e.g., two opposite recesses in the walls and in the sack or tube-like form of the container, there may be, for example, welded carrier strips. By means of these devices, the containers can be suspended in frames in which the desired number of single containers is combined.

In the apparatus of the invention, either fresh or else putrefied sewage water of any origin can be treated, particularly urban sewage water. It is also possible to treat sewage to which, before it is introduced into the container 1, flocculating agents, such as lime or a crude phosphate or iron-or aluminium-sulphate, have been added; the settling time in the container 1 can be reduced by such flocculating agents.

An improved or accelerated separation of the water from the solid can be achieved in a simple manner by passing a gas, preferably air, e.g., through a pipe dipping into the sludge from above, which produces a turbulence or continuous circulation. The solid particles can thus not settle between the meshes of the fabric and the water can further continuously and freely flow out of the container unhindered. Where no air is available, it is also sufficient to achieve a turbulence or stirring effect by means of a submerged stirrer or other suitable device, in order to keep the solid particles in suspension.

Figure 6:
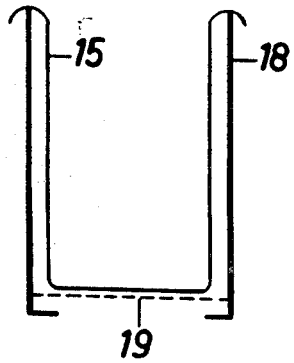
Figure 7:
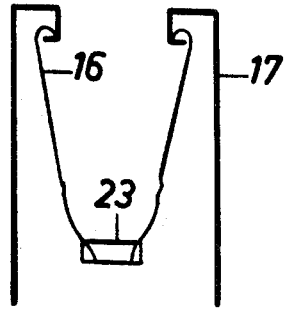

Modifications of the above-described apparatus are shown in FIGS. 5 to 7 of the drawings and described in Examples 2 and 3. The container no longer has a perforated bottom 2, and the fabric 4, the rollers 3 and 3', and the spray device 5, are dispensed with. Instead a sack 15 or tube 16 of a synthetic fabric, for example of a polyamide, such as polycaprolactam, polyethylene terephthalate, polyacrylonitrile, polyvinyl chloride or the like, is used. The following variants are possible:

(1) The sack 15 or tube 16 is suspended either (see FIG. 5) in a support frame 17, or in a tubular housing 18 of corresponding width (see FIG. 6) which can be open at the bottom or be provided with a perforated bottom 19;

(2) Particularly with a vessel capacity exceeding about 100 litres, it is preferable to mount below the sack a grating 20 of synthetic resin, steel tubing or the like (see FIG. 5) which takes the weight of the filled sack and is supported on corresponding supports 21 in the support frame or housing without any further anchorage;

(3) The support frame or housing can be arranged to tilt about the bearings 22 so that the sack contents which have become compact after a sufficient amount of water has run off, can be tipped out;

(4) If instead of a sack 15 a tube 16 is used (see FIG. 7) the bottom of this is provided with an easily manipulated closure 23 so that the tube 16 acts as a closed sack which can readily be emptied downwardly by opening the closure.

These embodiments of FIGS. 5 to 7 offer the following advantages over the embodiment of FIG. 1.

(a) The apparatus is simpler, lighter in weight and cheaper;

(b) The fabric cover and the spray device for the cleaning thereof are no longer necessary;

(c) The water runs more readily out of the sludge and the apparatus thus works faster;

(d) The emptying and cleaning of the container are most simple.

Further possibilities of variations which make possible an easy adaptation to specific local conditions, are provided by a suitable choice of the size of the sacks or by the arrangement of the sacks and, if desired, also by different mesh sizes of the fabric; the tubes, the bottom of which can be closed, are also to be understood as "sacks." It is possible, e.g., to suspend the quantity of sacks, corresponding to the daily accumulation of sewage, in a frame, to mount underneath the sacks a common grating and to collect the water flowing off this arrangement of sacks in a common reservoir or common channel. Also a larger plant is much less expensive than a corresponding settling tank in which, for the separation of water and sludge moreover a considerably longer period of time is necessary.

In comparison to the hitherto usual settling tanks, the apparatus and method according to the invention has, above all, the advantage that a considerably larger proportion of the water adhering to the sludge, can be removed without any or without a substantial power consumption. The apparatus can be readily operated and serviced, requires much less space than a settling tank and also makes possible a relatively quick throughput of larger amounts of sludge.

In yet another embodiment of the invention (not illustrated) the container is partly solid and is partly made of a porous fabric; for example in such a way that the lateral walls are solid, whilst the base and/or the lower part of the lateral walls are of fabric. This gives the possibility of easily replacing that part which is subject to the greatest loading and stressing by the sludge i.e., the lower part and/or the base.

In order that the invention may be well understood the following examples are given by way of illustration only:

EXAMPLE 1

A sewage sludge with a water content of 93% which has been flocculated with 15% by weight of lime and 7.5 percent by weight of iron sulphate is introduced into the apparatus of FIG. 1. The cylindrical container 1 has a capacity of 100 liters and has a wall thickness of 5 mm. of polyethylene. The bottom of this vessel is perforated with holes 2 of a diameter of 3 mm. and covered with a fine-meshed fabric 4 of polyamides having 100 meshes per cm.² The position of this fabric 4 between the rollers 3 and 3' can be changed by rotating it in either direction, and the fabric can be sprayed with water by means of a suitable device 5. The water drops through the perforated bottom into a reservoir 6 positioned thereunder where it is collected. After settling for a few days, a sump 7 forms at the bottom of the plastic vessel 1, and above this a slightly coloured but substantially clear liquid 8, the quantity of which is about 70% of the original sludge and the organic material content of which is about 1%. This liquid is syphoned off by means of suction pipe 9 and led to the reservoir 6. The sump is allowed to settle for a few days in the container 1 until it is compact, i.e., can be dug out. It is then brought on to a suction cell filter 10 (see FIG. 4). The residues 11 resulting from the suction cell filter have now a water content of only 30 to 35% and can be used in this form as soil improving agent or worked up further by addition of inorganic nutrients to form a fertiliser, if desired also with the addition of pest control agents.

The same results are obtained when the container is made of polypropylene or polycaprolactam or a similar plastic and/or the cover is made of polyacrylonitrile, polyethylene terephthalate or similar synthetic fibres.

EXAMPLE 2

Seven containers, of the kind shown in any of FIGS. 5 to 7, each of a capacity of 1.2 cm. are suspended in a common frame having a common grating which consists, e.g., of a common bottom plate with large bores. Such an arrangement is capable of processing 7 m.³ of sludge per day, which corresponds to the sewage of a community of 10,000 inhabitants.

Seven containers are filled with sludge each day.

The sludge must then settle for 2 days in the containers until it has lost about half its water. This means, however, that the 7 containers filled on the first day, can again be re-filled on the 4th day at the earliest, if one starts from the fact that the containers filled on the first and second days are emptied and cleaned on the third day, which may be done simply by rinsing. With a reserve of 7 containers intended to take up the sludge accumulating per day, 28 perforated sack containers must then be accommodated in a common support frame to be able to take up the sludge originating from 10,000 inhabitants and to separate the water therefrom, as described above.

EXAMPLE 3

7 m.³ of sewage sludge of a water content of 95% is introduced per day into a plant having 28 sacks, of the kind shown in any of FIGS. 5 to 7. The sacks have a capacity of 1.2 m.³.

After the sludge has stayed in the sacks for 2 days, a quarter of the water had already run off, whilst a further quarter had formed a clear layer above the sump and could readily be syphoned off. The water running off was clear whilst the syphoned off portion still contained traces of organic material.

The residue from which further water was removed in a suction cell filter, contained 30% of water. By mixing 66 parts by weight thereof with 17 parts by weight of potassium chloride and 17 parts by weight of 46% urea, a valuable fertiliser was obtained containing 8% of N, 8% of $P_2O_5$, 10% of $K_2O$ and 15% of organic material.

What is claimed is:

1. A method of removing water from sewage sludge comprising the steps of:
    (a) introducing the sludge into a container which has a porous bottom which permits water to pass therethrough,
    (b) placing beneath said porous bottom a laterally displaceable permeable fabric having mesh apertures which are smaller than the flow passages in the bottom of said container,
    (c) passing the water coming from said porous bottom throuh said permeable fabric to collect thereon the solid particles in said water which are larger than said mesh apertures and to pass therethrough the water and smaller solid particles,
    (d) laterally displacing said fabric and cleaning it of solid particles by spraying it with water,
    (e) allowing the sludge to settle in the container until it separates into two layers, the upper layer being a supernatant layer of water, and
    (f) leading off said upper layer of water.

2. The method as claimed in claim 1 comprising the further step, before allowing the sludge to settle, of creating turbulence in the sludge to keep the solid particles contained therein in suspension, thereby allowing water to run more freely through the porous bottom.

3. The method as claimed in claim 2 in which said turbulence is created by introducing a gas into the sludge.

4. The method as claimed in claim 1 wherein the step of laterally displacing said fabric further comprises continuously laterally displacing said fabric as water passes through it so that the part underneath the container remains sufficiently free of sludge particles so that the mesh is not clogged.

5. Apparatus for removing water from sewage sludge comprising:
    (a) a container having a porous bottom,
    (b) a fabric of synthetic fiber disposed underneath the container, whereby water flowing out of said container through said porous bottom then passes through the fabric,
    (c) means for tensioning the fabric and for displacing it laterally underneath the container,
    (d) a spray device for cleaning the fabric,
    (e) a reservoir for collecting water flowing from the container, and,
    (f) means for discharging liquid at the top of the container,
and wherein the mesh apertures of said fabric are smaller than the flow passages in the porous bottom of the container.

6. Apparatus as claim 5 in which said container has, at least in part, the form of a suspended sack of synthetic fabric.

7. Apparatus as claimed in claim 5 in which at least the upper part of the lateral walls of the container are solid and in which at least part of the lower part of the container is of fabric.

8. Apparatus as claimed in claim 5 including means for creating turbulence in the sludge within said container.

9. Apparatus as claimed in claim 5 in which the fabric consists of polyamide fibers.

10. Apparatus as claimed in claim 5 in which the means for discharging the liquid at the top of the container is a suction cell filter.

References Cited

UNITED STATES PATENTS

| | | | |
|---|---|---|---|
| 833,829 | 10/1906 | Gamble | 210—74 X |
| 2,043,265 | 6/1936 | Roeder | 210—10 X |
| 2,097,529 | 11/1937 | Nordell | 210—400 X |
| 2,551,175 | 5/1951 | Smith | 210—489 |
| 2,777,815 | 1/1957 | Forrest | 210—3 |
| 2,798,609 | 7/1957 | Smith et al. | 210—66 |
| 3,259,570 | 7/1966 | Priesing et al. | 210—10 X |
| 3,317,047 | 5/1967 | Hansen | 210—152 X |
| 3,440,949 | 4/1969 | Trussell | 210—152 X |

MICHAEL E. ROGERS, Primary Examiner

U.S. Cl. X.R.

210—66, 387, 434